March 14, 1950

C. S. ROBINSON 2,500,379

GUN CAMERA MOUNT

Filed Dec. 1, 1945

INVENTOR.
CECIL S. ROBINSON.
BY Robert V. Moure
ATTORNEY.

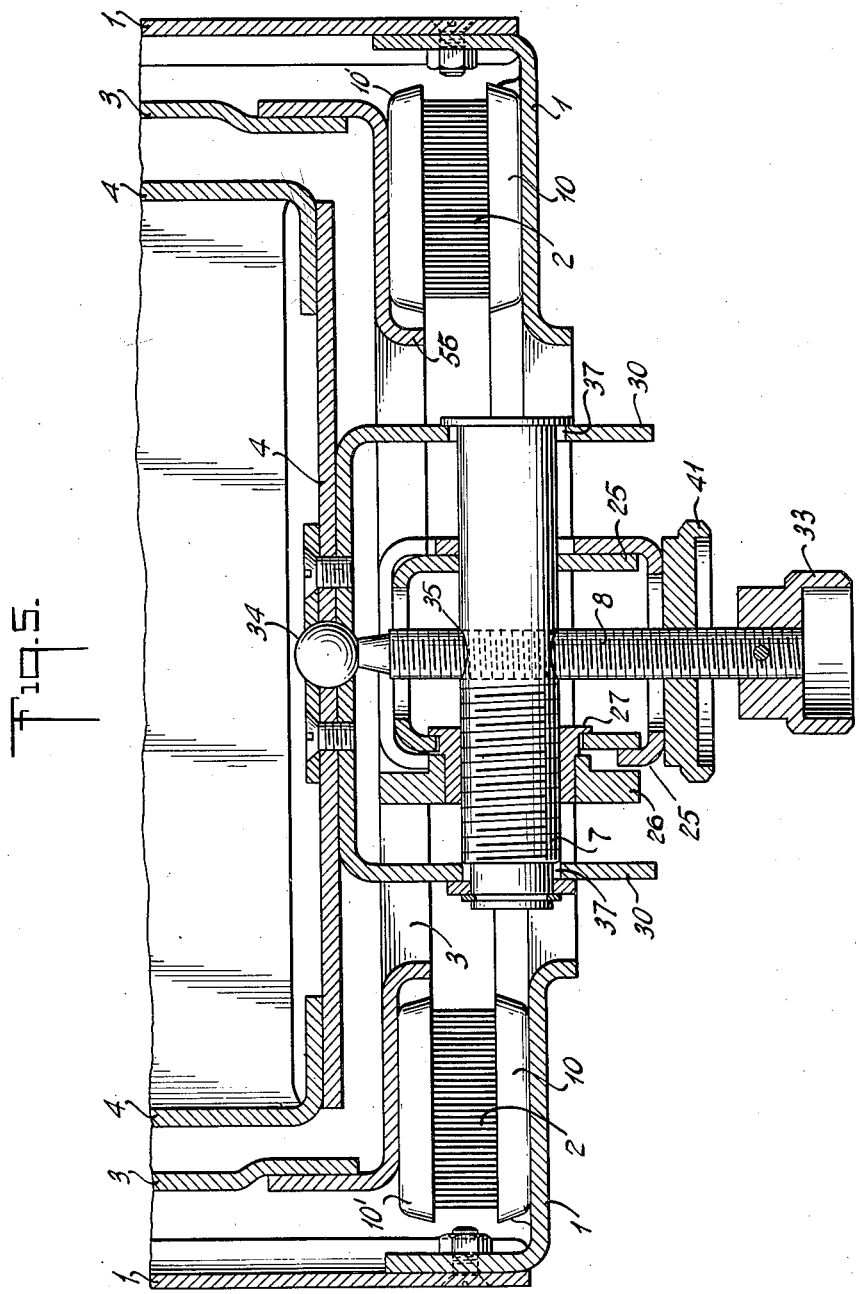

Patented Mar. 14, 1950

2,500,379

UNITED STATES PATENT OFFICE 2,500,379

GUN CAMERA MOUNT

Cecil S. Robinson, New York, N. Y.

Application December 1, 1945, Serial No. 632,240

6 Claims. (Cl. 248—178)

This invention relates to shock absorbing camera mounts, particularly for military aircraft, where cameras are exposed to the shocks and vibrations incident to gun fire. The general object of the invention is to permit the taking of smooth, steady motion pictures during machine gun and cannon fire in fighting airplanes, to help spot enemy ground positions during dive-bombing attacks, and record enemy combat tactics in the air for further study by our pilots. These cameras are generally arranged to automatically take pictures whenever the aircraft guns are fired. Various attempts have been made in the past to cushion the camera so as to eliminate objectionable shock and vibration, but due to the severity of the impacts ordinary cushioning has not been successful in attaining the results desired.

The principal object of the present invention is to improve the quality of such pictures and protect the camera; other objects are to provide convenient means for inserting and removing the camera and for adjusting it in correct alignment with the gun. Various other objects incidental thereto will become apparent as the description proceeds.

Referring now to the drawings, Fig. 1 is a side elevation view of the cushioned mount in which the camera is held.

Fig. 5 is an enlarged cross-section taken on the line 5—5 of Fig. 1.

Similar reference numerals refer to similar parts thruout the various views.

Figure 1:
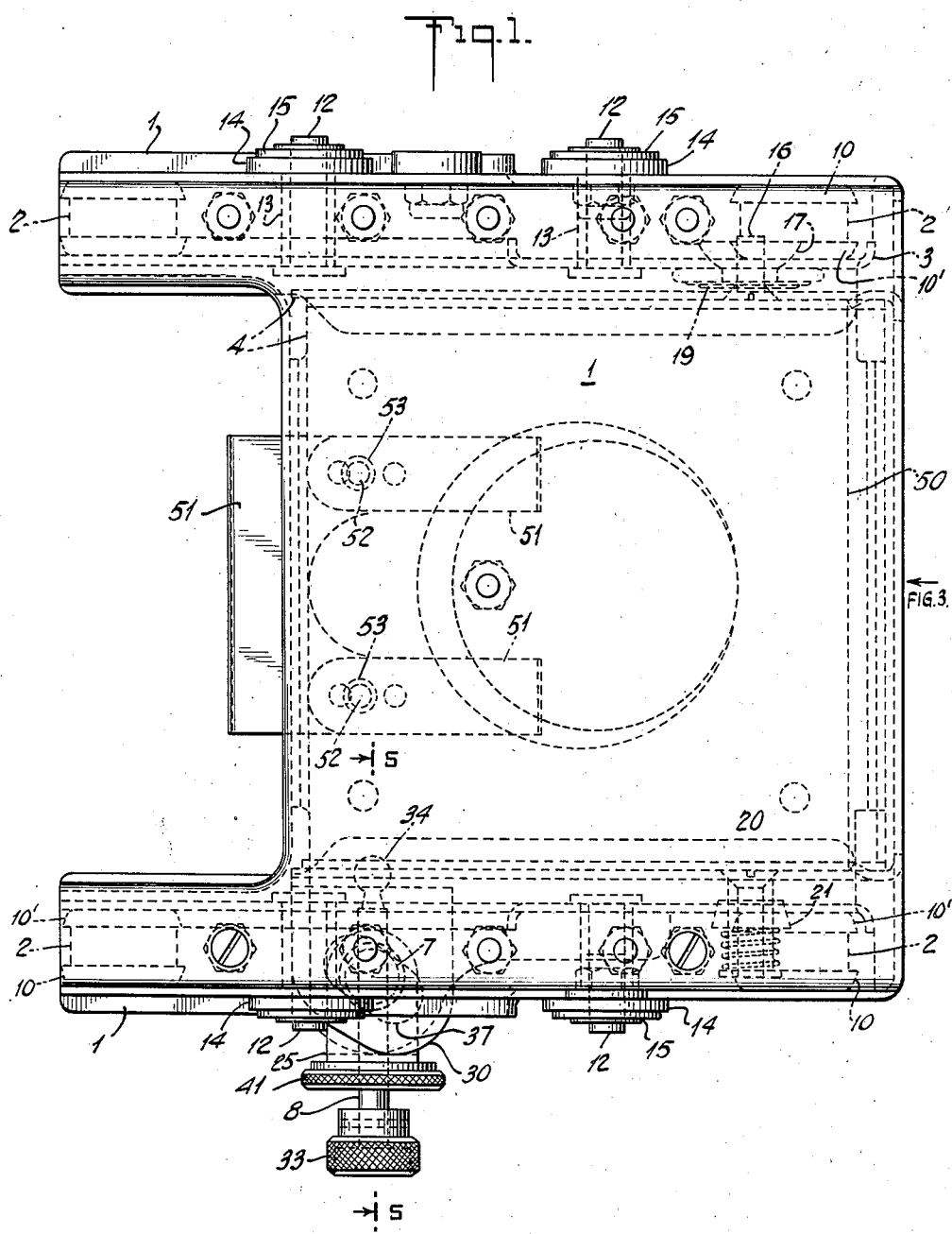
Figure 2:
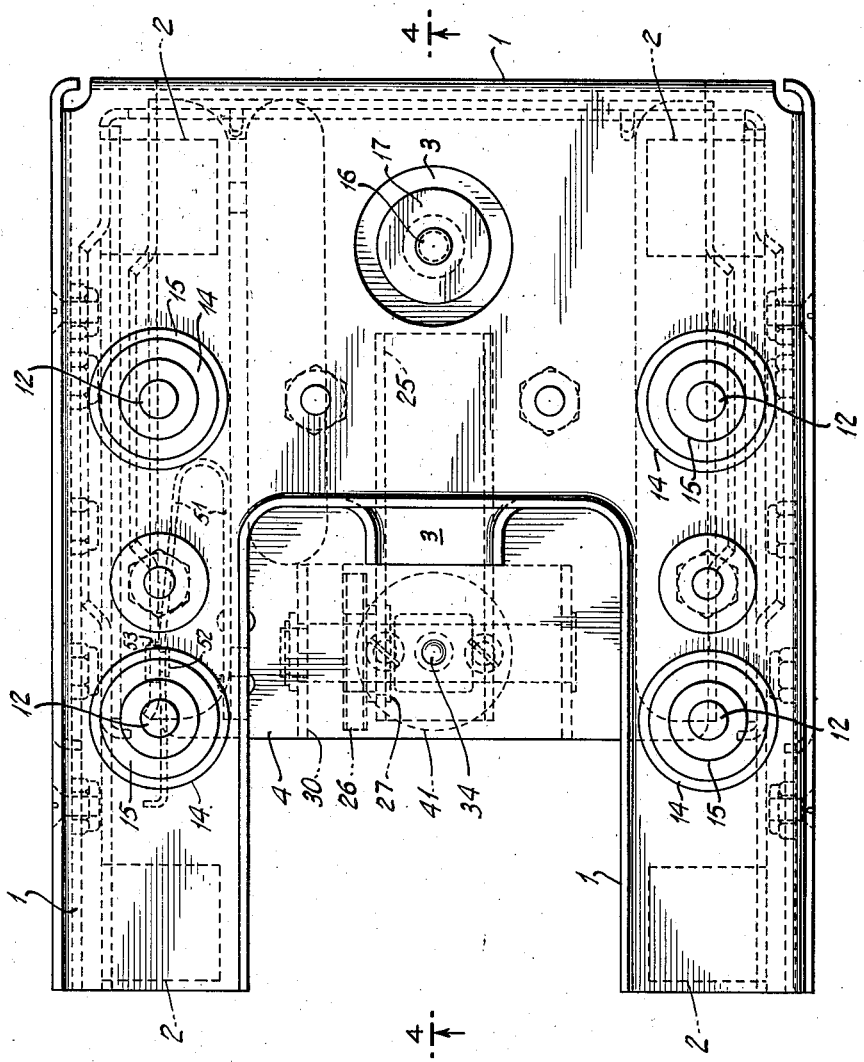
Fig. 2 is a top plan view of the same.
Figure 3:
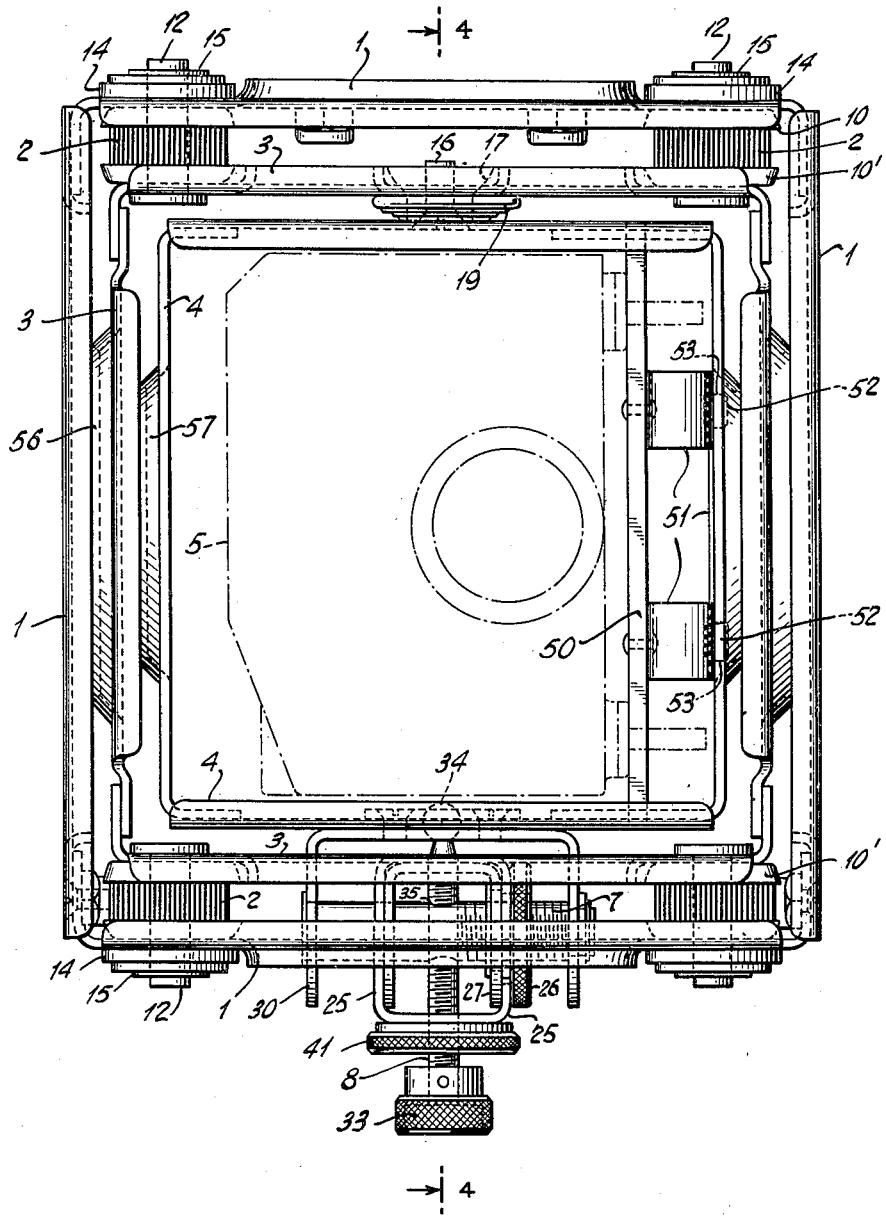
Fig. 3 is an end elevation looking in the direction of the arrow in Fig. 1.
Figure 4:
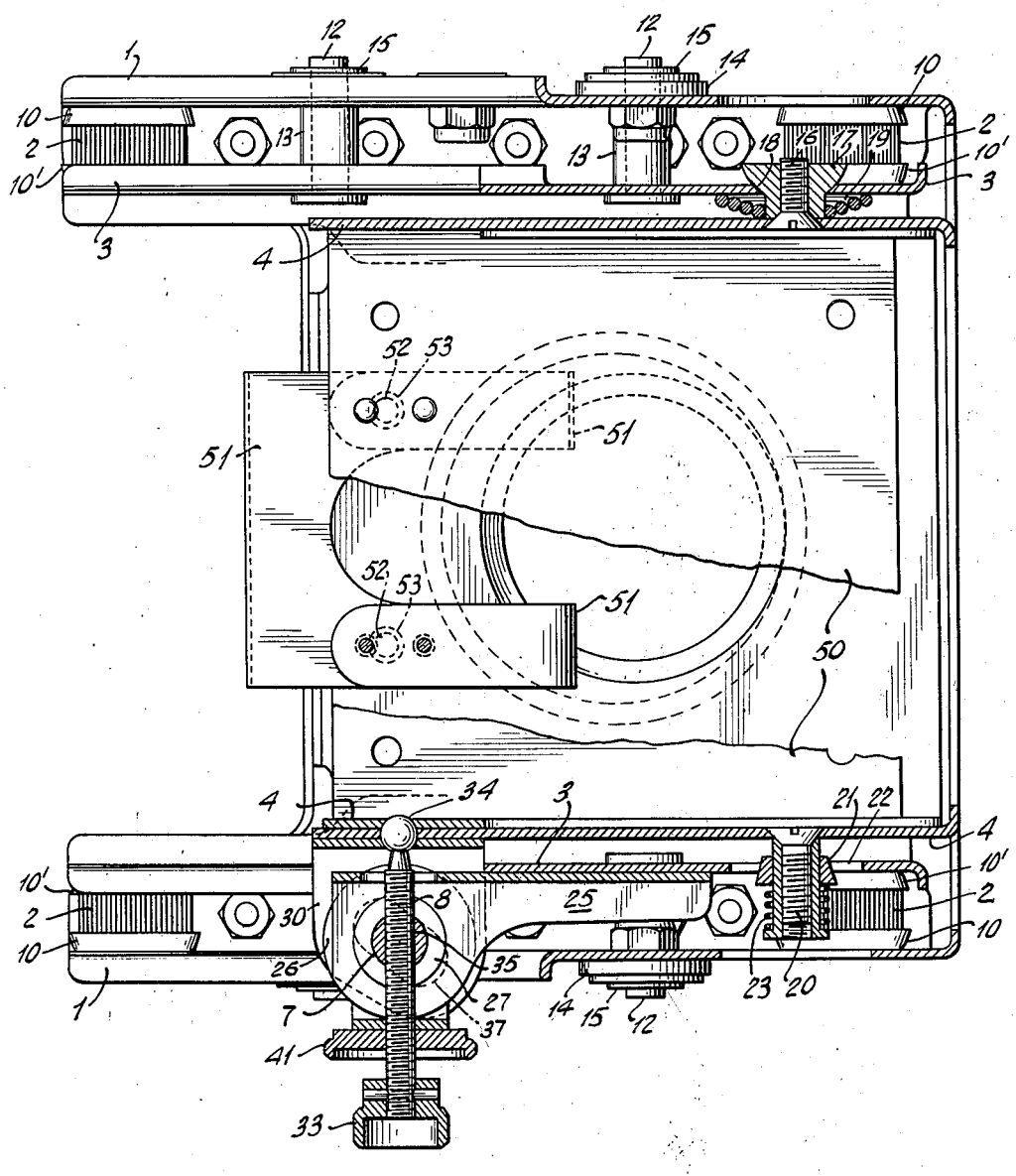
Fig. 4 shows cross-sections taken on the line 4—4 of Fig. 3 and on the line 4—4 of Fig. 2.

As shown in Fig. 1 and Fig. 2, but probably best seen in cross-section in Fig. 3 and Fig. 4, the apparatus consists in general of an outer casing 1 carrying a number of cushions 2 which support an intermediate casing 3 in which is movably mounted a housing 4 adapted to hold a moving picture camera 5, (indicated by broken lines in Fig. 3). The cushions 2 are so mounted as to absorb the gun recoil shocks and other vibrations, and the inner housing 4 is adjustable by means of the screws 7 and 8 so that the camera may be aligned with the line of gun fire when in action. Once so aligned, the camera may be inserted or removed without disturbing the setting, so as to maintain the alignment.

Taking up the construction more in detail, the outer casing 1 consists of a generally rectangular box-like structure whose exterior is shown in Fig. 1 and Fig. 2. In order to permit the use of an inserted camera 5, the casing 1 is open at both ends, as will be most clearly seen in Fig. 4. A number of sponge rubber blocks or cushions 2, generally eight of them, are mounted in cup-like recesses 10 located near the several corners of the rectangular casing 1. These cushions 2 support the intermediate casing 3, which has similar cup-like recesses 10' to receive them. The cushions or elastic blocks 2 are preferably not bonded to the metal cups 10, 10' as has often been the case in the past, since our tests have shown that a lack of bonding improves the resilient or absorptive qualities, as well as permits the cushions to be readily changed for those of other desired characteristics. The cushions 2 absorb ordinary vibrations in compression, and generally absorb the heavy impacts of gun recoil in shear. Their wide spacing gives the stability essential in a sighting instrument.

In order to stabilize the cushions 2 and permit their assembly under a certain amount of initial compression, as well as to limit their expansion, rubber mounted retaining studs 12 are provided, as shown most clearly in Fig. 1 and Fig. 4. These operate generally in tension to oppose the cushions 2 which operate in compression or shear, and consist of cylindrical rubber bushings 13 as spacers surrounding the studs 12 with considerable clearance to permit recoil, and on the outside rubber washers 14 capped with metal washers and lock clips 15.

Referring again to Fig. 3 and Fig. 4, it will be seen that the foregoing construction provides an intermediate cushioned casing 3 somewhat similar to the outer casing 1 but protected from the shocks and vibrations which reach the outer casing 1. A camera attached directly to this casing 3 would be protected from shocks, but would probably not be in exact alignment with the adjacent gun or line of fire, or might readily lose its alignment under service conditions. It is therefore necessary to provide an inner housing 4 to firmly hold the camera 5, this housing 4 being attached to the cushioned casing 3 but provided with means for adjusting its alignment relative thereto.

The housing 4 has at 16 a pivotal point of attachment to the casing 3, this attachment consisting of the stud 16 carrying the rounded or tapered collar 17 fitting in a corresponding socket or hole 18 in the intermediate casing 3, in which it is held by the action of the spring 19. This pivotal connection, being of the ball and socket type, permits sufficient freedom of motion for adjustment both vertically and transversely.

To steady the inner housing 4, permit vertical adjustment, and to provide a pivot line for transverse adjustment, a supplementary movable pivot 20 best seen in Fig. 4 is attached to the bottom of the housing 4 by means of a tapered or rounded collar 21 held in the slot 22 by the spring 23. It will be noted that whereas the rounded collar 17 fitted in a corresponding rounded socket 18, the rounded collar 21 of the pivot 20 fits in a slot 22 so as to permit vertical tilting of the housing 4, but forming a rotational axis with the pivot 16 for transverse adjustment. The reason for this will become apparent in connection with the elevating and traversing adjusting screws which will now be described.

Referring now to the drawings, more particularly Fig. 4 and 5, it will be seen that a screw 7 is held in a bracket 25 which is integral with or fixedly attached to the inner casing 3. Threaded on the screw 7 is a rotatable wheel or nut 26 held by a collar 27 from having any longitudinal movement relative to the bracket 25. In other words, when the nut 26 is turned, the screw 7 moves longitudinally within it and relative to the bracket 25. As seen in Fig. 5, when the nut 26 is rotated the screw 7 moves to the right or left.

On the ends of the screw 7 are flanges engaging the bracket 30 which is fastened to and extends down from the housing 4 which holds the camera. Turning the traversing nut 26 and moving the screw 7 to the right or left thus moves the housing 4 to the right or left to align the camera. The pivots 17 and 21 form the axis about which this transverse adjustment of the camera housing 4 takes place.

The vertical adjustment of the housing 4 is obtained by manipulating the knob 33 which turns the vertical screw 8 attached by the ball and socket joint 34 to the housing 4. This screw 8 is threaded into a tapped hole 35 passing thru the center of the larger screw 7. Rotation of the screw 8 lifts bodily up or down relative to the screw 7 and carries the housing 4 up or down with it, this up or down motion being about the upper pivot 17 as a center, while the lower pivot 21 slides in the slot 22 to permit the elevation. In order that this up or down motion may be possible relative to the fixed screw 7, the clearance holes 37 in the depending bracket 25 are not round, as might be supposed from Fig. 5, but are arcuate slots 40 as shown in Fig. 1 and Fig. 4, with the pivot 17 as their center. They therefore do not bind or interfere with the vertical adjustment of the camera about the pivot 17 as a center. A locking nut 41 holds the screw 8 in position after it is adjusted by the knob 33.

The camera 5 itself, shown dotted in Fig. 3, is mounted on a mounting plate 50, which carries a pair of spring fingers or clips 51 having buttons 52 which spring into the engaging holes 53 in the housing 4 when the camera is inserted and hold it in place in the housing. The plate 50 slides in a carefully milled groove in the housing 4, and the tips of the spring 51 project as shown in Fig. 2, so that it can be depressed to remove the camera. The spring 51 also prevents any play or looseness in the mounting.

In order to lighten and stiffen the structure, which is usually made of aluminum, plastic or some other light material, large holes are provided surrounded by projecting rims such as shown at 55 in Fig. 5 and at 56 and 57 in Fig. 3. These rims 56 and 57 do not touch each other and serve no mechanical purpose other than lightening the structure and affording some access to the various casings.

The general operation will be apparent from the foregoing. If the camera is not equipped with a convenient sight or finder, a dummy camera having an equivalent sight or telescope may be inserted on a similar mounting plate 50 and used for precise alignment before the camera itself is inserted. The vibrations are absorbed quite effectively by the large areas of the cushions acting in compression as distinguished from the shear type mounts. However, the apparatus has ample strength to resist the shocks of gun recoil, since those are taken by the same cushions in shear, transversely of their wider dimension. This combination of compression for vibration and shear for shock has been tested in actual practice with satisfactory results; and the fact that the cushions were not bonded to the metal has not only improved their action but has also permitted the most desirable cushion density and precompression to be determined by trial.

While I have in the foregoing described certain specific forms by way of example, it will be understood that they are merely for purposes of illustration to make clear the principles of the invention, which is not limited to the particular forms shown, but is susceptible to various modifications and adaptations in different installations as will be apparent to those skilled in the art without departing from the scope of the invention as stated in the following claims.

1. In a camera mount, the combination of an outer casing, an intermediate casing, vibration absorbent cushions between said casings, said cushions being normally in compression, an inner housing adapted to hold a camera, means for adjusting the alignment of the inner housing relative to the casings, a camera mounting plate slidable in the inner housing, and a spring retaining means for holding the plate in place.

2. In a camera mount, the combination of an outer casing, an intermediate casing, vibration absorbent cushions between said casings, said cushions being normally in compression, cushioned retaining studs between said casings to limit the action of the first mentioned cushions, said studs normally operating in tension to oppose the cushions in compression, an inner housing adapted to hold a camera, means for adjusting the alignment of the inner housing relative to the casings, a camera mounting plate slidable in the inner housing, and a spring retaining means for holding the plate in place.

3. In a camera mount, the combination of an outer casing, an intermediate casing, unbonded vibration absorbent cushions between said casings, an inner housing adapted to hold a camera, a socket connection between the intermediate casing and the inner housing, and elevating and traversing screws for aligning the inner housing relative to the casings.

4. In a camera mount, the combination of an outer casing, an intermediate casing, vibration absorbent cushions between said casings, an inner housing adapted to hold a camera, a universal socket connection between the intermediate casing and the inner housing, a second socket between the intermediate casing and the inner housing, said second socket being movable bodily in elevation about the first mentioned socket as a center and permitting transverse motion of the housing about both sockets as an axis, a traversing screw, a traversing nut for moving the inner housing transversely relative to the casings, an elevating screw and knob for elevating the inner housing relative to the traversing screw and the casings, whereby the inner housing may be aligned relative to the casings.

5. In a camera mount, the combination of an outer casing, an intermediate casing, vibration absorbent cushions between said casings, an inner housing adapted to hold a camera, a universal socket connection between the intermediate casing and the inner housing, a second socket between the intermediate casing and the inner housing, said second socket being movable bodily in elevation about the first mentioned socket as a center and permitting transverse motion of the housing about both sockets as an axis, a traversing screw, a traversing nut for moving the inner housing transversely relative to the casings, an elevating screw and knob for elevating the inner housing relative to the traversing screw and the casings, means for locking said knob against vibration, a camera mounting plate slidable in the inner housing, and a spring retaining means for holding the plate in place.

6. In a camera mount, the combination of an outer casing, an intermediate casing, vibration absorbent cushions between said casings, said cushions being normally in compression, cushioned retaining studs between said casings to limit the action of the first mentioned cushions, an inner housing adapted to hold a camera, a universal socket connection between the intermediate casing and the inner housing, a second socket between the intermediate casing and the inner housing, said second socket being movable bodily in elevation about the first mentioned socket as a center and permitting transverse motion of the housing about both sockets as an axis, a traversing screw, a traversing nut for moving the inner housing transversely relative to the casings, an elevating screw for elevating the inner housing relative to the transverse screw and the casings, a camera mounting plate slidable in the inner housing, and a spring retaining means for holding the plate in place.

CECIL S. ROBINSON.

REFERENCES CITED

The following references are of record in the file of this patent:

UNITED STATES PATENTS

| Number | Name | Date |
|---|---|---|
| 1,880,992 | Sparling | Oct. 4, 1932 |
| 2,169,432 | Robinson | Aug. 15, 1939 |
| 2,284,771 | Schrak | June 2, 1942 |